H. W. JACOBS & H. H. LANNING.
APPARATUS FOR PURIFYING GASES.
APPLICATION FILED MAY 18, 1912.
1,051,956.
Patented Feb. 4, 1913.
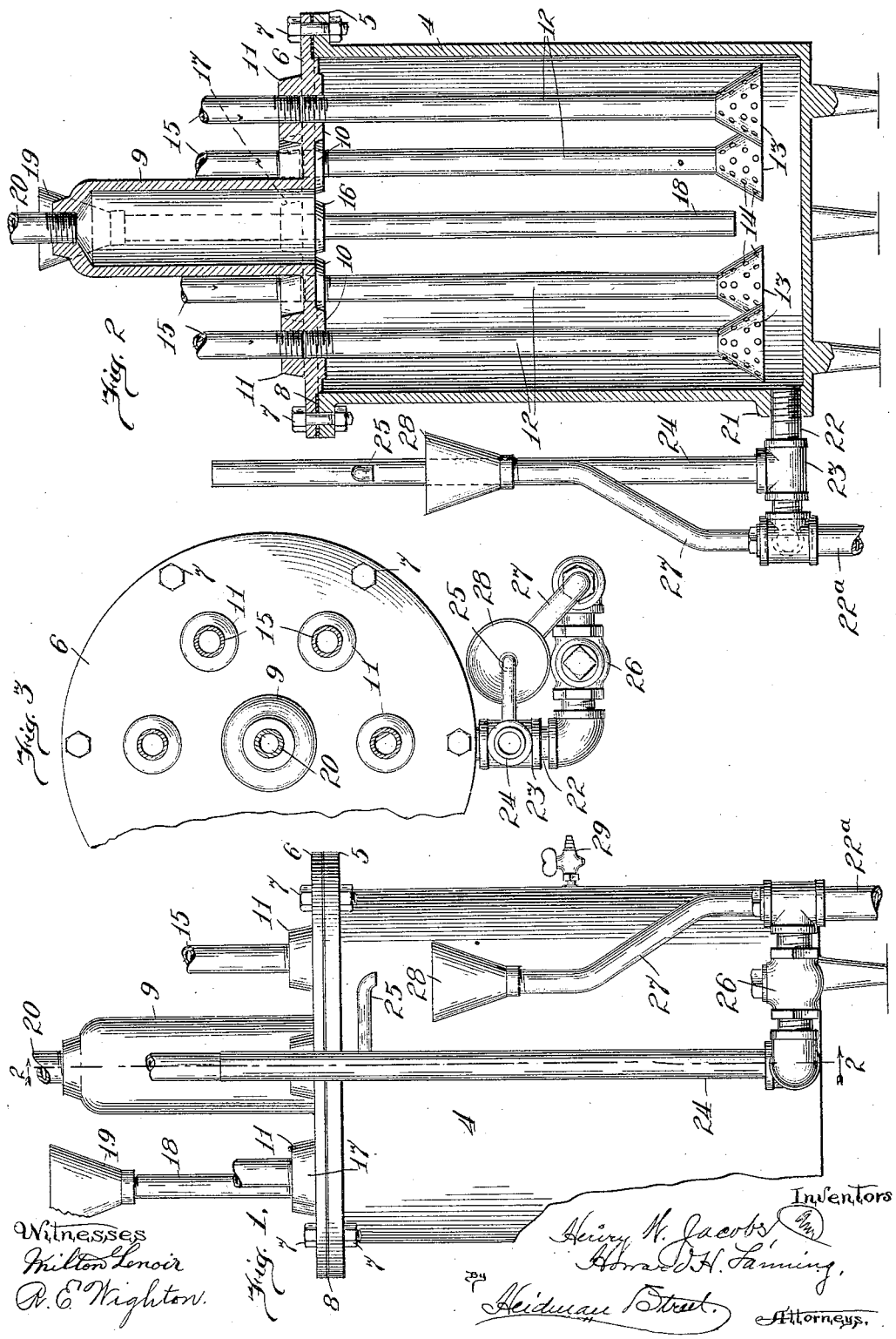

UNITED STATES PATENT OFFICE.

HENRY W. JACOBS AND HOWARD H. LANNING, OF TOPEKA, KANSAS.

APPARATUS FOR PURIFYING GASES.

1,051,956.  Specification of Letters Patent.  Patented Feb. 4, 1913.

Application filed May 18, 1912. Serial No. 698,303.

*To all whom it may concern:*

Be it known that we, HENRY W. JACOBS and HOWARD H. LANNING, citizens of the United States, and residents of Topeka, in the county of Shawnee and State of Kansas, have invented a certain new and useful Improvement in Apparatus for Purifying Gases, of which the following is a description, reference being had to the accompanying drawing, which forms a part of our specification.

Our invention relates to an apparatus wherein the raw or impure gas is passed through water for the purpose of purifying or cooling the gas; and has for its object the production of what may be termed a purifier or scrubber in which the gas will be forced into direct contact with and made to pass through the purifying or cooling water.

Another object of our invention is to provide an apparatus which comprises means whereby a constant flow of water may be obtained through the scrubber or device, so that a stream of pure water will constantly be had; the device being so arranged that the inflowing pure water will displace an equal quantity of the impure or contaminated water.

The object of the invention is to provide an apparatus whereby the constant changing of water can be effected while a stream of gas is being passed through the scrubber or device without, however, causing any loss of the gas or in any manner interfering with the function of the apparatus, as will be more fully understood from the following detailed description of the accompanying drawing, wherein:—

Figure 1 is a side elevation of the device with a portion of the receptacle and the conduits or pipes connected therewith shown broken away. Fig. 2 is a vertical sectional view taken on the line 2—2 of Fig. 1. Fig. 3 is a top plan view with a portion of the receptacle proper and its cover shown broken away.

In the exemplification of our invention, as illustrated in the drawing, the apparatus consists of a suitable vessel or receptacle 4, preferably cylindrical in form and adapted to retain water. The receptacle 4 is shown provided at the top or open end thereof with an annular flange 5, to which is secured a cover 6, by means of the bolts 7. In order to form a gas tight joint between the cover and the receptacle, a suitable gasket may be interposed as shown at 8.

The cover 6 is provided with a gas-receiving chamber or dome 9, which may be secured to the cover in any suitable manner, but is preferably made integral with the cover, as clearly shown in Fig. 2, and centrally located; the dome being open at the bottom and in communication with the upper part of the receptacle or main body portion 4. We prefer to provide the under side of the cover 6 with a suitable number of bosses as shown at 10 which are preferably arranged in a circumferential manner about the centrally located gas-receiving chamber or dome 9. The upper part of the cover is also provided with bosses 11 arranged at points coincident with the bosses 10 on the under side of the cover; and these bosses 10 and 11 are provided with screw-threaded openings extending therethrough, as can more clearly be seen in Fig. 2. The bosses 10 receive the upper threaded ends of conduits or pipes 12 which extend downwardly within the receptacle 4 and terminate in close proximity to the bottom of the receptacle. The lower ends of the pipes 12 are provided with the inverted open ended funnels 13, the side walls whereof are provided with a suitable number of perforations 14. The bosses 11, on the upper or outer side of the cover 6, receive the threaded ends of the conduits or pipes 15 which may be said to practically constitute a continuation of the conduits 12 located within the receptacle 4. By forming these conduits in sections, as shown and described, and having their ends screwed into the threaded openings in the bosses 10 and 11, it is apparent that a gas tight connection may be easily formed. The cover 6 is also provided on its under side with a boss 16, and on its upper or outer side with a boss 17,—see Fig. 1, and shown in dotted lines in Fig. 2,—which are also provided with registering screw-threaded openings extending therethrough, into which are screwed the threaded ends of a sectional pipe or conduit 18; the lower end whereof is open and in close proximity to the bottom of the receptacle or vessel 4, while the upper or outer section of the conduit or pipe 18 extends above the cover a suitable distance and preferably terminates in, or is provided with, a funnel 19. The object in forming conduit or pipe 18 in sections is to enable a gas tight joint being formed at the point where it passes through the cover.

The upper part of the dome or gas-receiving chamber 9 is provided with an opening, which is preferably screw-threaded, to receive the conduit or pipe 20 whereby the gas which has accumulated in the dome 9 may be conveyed to the point where it is to be consumed or used.

At a point in proximity to the bottom, we prefer to provide the receptacle or body portion 4 with a boss as at 21 which is provided with a threaded opening adapted to receive the pipe 22, whereby the contents of the receptacle 4 may be drained. The pipe 22 is shown provided with a T-connection 23, which receives a riser pipe 24, which extends upward to a suitable height, with the upper end open to the atmosphere as shown. The riser pipe 24, is provided with an overflow spout 25, located at a suitable point, slightly beneath the horizontal plane of the upper part of receptacle 4, so that the gas pressure acting on the surface of the water within the receptacle or chamber 4, which will force the water through pipe 22 and upward within pipe 24, may force the water up to overflow spout 25 under normal operating conditions.

Drain pipe 22$^a$ is provided with a cock or valve at a point beyond the T-connection 23, as indicated at 26, see Figs. 1 and 3, whereby the flow of water through drain pipe 22 is controlled. Drain pipe 22$^a$ is continued beyond the cock 26 and may have sewer connections for the proper disposal of the drained off water. Communicating with drain pipe 22$^a$ at a point beyond valve 26, that is intermediate of valve 26 and the discharging end of drain pipe 22$^a$, is an overflow pipe 27 which extends upwardly to a point beneath overflow spout 25 in riser pipe 24; the upper end of overflow pipe 27 being preferably provided with the funnel shaped orifice 28. Connecting the overflow pipe 27 with drain pipe 22$^a$ at a point beyond valve 26, permits the overflow discharged from riser pipe 24 to be conducted to the sewer while valve 26 is closed, namely during the operation of the apparatus.

The receptacle or main body portion 4 is provided with a suitable valve or pet cock 29 which is preferably located about midway between the top and bottom of the receptacle as clearly shown in Fig. 1. The purpose of this cock 29 is to enable the level of the fluid of water within the receptacle to be determined while the apparatus is being charged with water.

The operation of the apparatus is as follows:—The receptacle 4 is filled with water, which is introduced through funnel 19 and pipe 18; and the level of the water in the receptacle is determined by opening cock 29, so that the receptacle will not be filled with water beyond the horizontal plane occupied by the pet cock 29. When the receptacle has been filled to the level of the cock 29, a small stream of cold water, from any suitable source of supply, is allowed to continuously run into the apparatus through pipe 18, so that the water within the receptacle will constantly be changed and tempered. The raw or impure gas, which is to be either purified or cooled, or both, is then introduced into the receptacle 4, through the series of conduits or pipes 15, which pipes or conduits communicate with the source or sources of gas supply. The gas is discharged from pipes 15 into the pipes 12 within receptacle 4, and is discharged through the perforations in the inverted funnel shaped orifices at the bottom of the receptacle. The gas being divided or separated into small jets, through the action of the perforated funnels 13, rises in the form of small bubbles through the water contained within the receptacle 4. The separation of the gas into the jets or small bubbles enables the gas, during its upward passage through the water, to become cooled and at the same time purified, through its intimate contact with the water; the impurities either remaining suspended in the water or precipitating to the bottom of the receptacle, while the scrubbed or purified gas rises within the gas chamber or dome 9 from whence it is conveyed through pipe 20 to the place desired.

The apparatus may be employed to purify or cool the gas generated in separate gas generators, and therefore the pipes or conduits 15 may each be connected with a separate generator. With the conduits 12 extending into proximity with the bottom of receptacle 4 and therefore beneath the water level in the receptacle, the water will act as a water seal and prevent the gas coming from one generator flowing into or escaping back through any of the other conduits 12 and 15, communicating with a generator having less pressure or that might be open to the atmosphere. Although one scrubber may be employed, common to a number of generators, the arrangement of the conduits or pipes, as shown and described, leaves each generator connected with the scrubber-apparatus entirely independent of the others in its operation.

Where it is desired to convey the gas to the scrubber from a single generator or common source of gas supply, the pipes 15 may be unified at a point intermediate of the scrubber and the generator or connected with a manifold having communication with a single generator.

As before stated, the ends of the funnels 13 are left open, so that any sludge or solid matter that may be carried over from the generators, may be allowed to escape freely into the water of the purifying chamber and thereby prevent clogging the perforations and interfering with the proper operation or function of the perforated funnels. As shown, these funnels 13 are somewhat above the point where pipe 22 communicates with receptacle 4, so that gas will not pass through pipe 22 and out through riser pipe 24.

The small stream of fresh water which is kept constantly flowing into the apparatus through pipe 18, as previously described, will displace a like quantity of the water that has been in contact with the gas in receptacle 4. The displaced impure water is forced out of receptacle 4 through pipe 22, upward through riser pipe 24 and allowed to escape from overflow spout 25, which discharges it into funnel 28 of pipe 27, which connects with drain-pipe 22ª beyond valve 26, so that the overflow may be properly disposed of.

After all the gas it is desired to pass through the apparatus has been scrubbed or purified, or cooled, or whenever it becomes necessary to do so, the water in the receptacle 4 may be drained through pipe 22ª by opening valve 26.

In practice, the riser pipe 24 is made of a height to suit pressure on the gas which is passing through the apparatus. It will also be understood that the number of bosses formed on the cover 6 corresponds with the number of gas conveying conduits 12 and 15, which are preferably circumferentially arranged as shown and described, depending upon the number of gas generators it is desired to connect with the apparatus.

What we claim is:—

1. An apparatus of the class described, comprising a receptacle, a removable cover for said receptacle, said cover being provided with bosses on its upper and lower faces, said bosses being provided with screw-threaded registering openings, a conduit for conveying water into said receptacle, said conduit being secured within the openings of one set of said bosses, gas conveying conduits communicating with one or more sources of gas supply, said conduits being formed in sections, the sections being screwed into the screw-threaded registering openings in the remaining set of bosses on the cover, the sections secured in the bosses on the under face of the cover extending downwardly within the receptacle to a point in proximity to the bottom of the receptacle, a gas-receiving chamber communicating with the upper part of the receptacle, and means whereby circulation of fresh water through the receptacle may be maintained without permitting gas to escape.

2. An apparatus of the class described, comprising a receptacle, a removable cover for said receptacle, said cover being provided with bosses on its upper and lower faces, said bosses being provided with screw-threaded registering openings, a conduit for conveying water into said receptacle, said conduit being secured within the openings of one set of said bosses, gas conveying conduits communicating with one or more sources of gas supply, said conduits being formed in sections, the sections being screwed into the threaded registering openings in the remaining set of bosses on the cover, the sections secured in the bosses on the under face of the cover extending downwardly within the receptacle to a point in proximity to the bottom of the receptacle, a gas-receiving chamber communicating with the upper part of the receptacle, means whereby the gas conveyed into the receptacle is divided into streams or jets, and means whereby the contents of the receptacle may be discharged.

3. A gas purifying apparatus, comprising a water retaining receptacle, a gas receiving chamber communicating with said receptacle, means whereby water may be introduced into said receptacle near the bottom thereof, gas conveying conduits communicating with one or more sources of gas supply and arranged to discharge the gas in the receptacle beneath the water level therein, and a riser or stand pipe connected at its lower end with the bottom of said receptacle and extending above the maximum water level in said receptacle and open at its upper end to the atmosphere, said pipe being provided with an outlet orifice intermediate of its ends so that water will be discharged therefrom at a predetermined point relative to the normal water level in the receptacle whereby variations of the pressure within the gas chamber may be compensated for without causing the water to be discharged faster than it is introduced and without permitting the escape of gas with the water.

HENRY W. JACOBS.
HOWARD H. LANNING.

Witnesses:
FRANK MITCHELL,
C. W. WRIGHT.

---

Copies of this patent may be obtained for five cents each, by addressing the "Commissioner of Patents, Washington, D. C."